Dec. 1, 1936.　　　C. E. BENNETT　　　2,062,289
ELECTRIC CABLE SYSTEM
Filed June 8, 1934　　　2 Sheets-Sheet 1
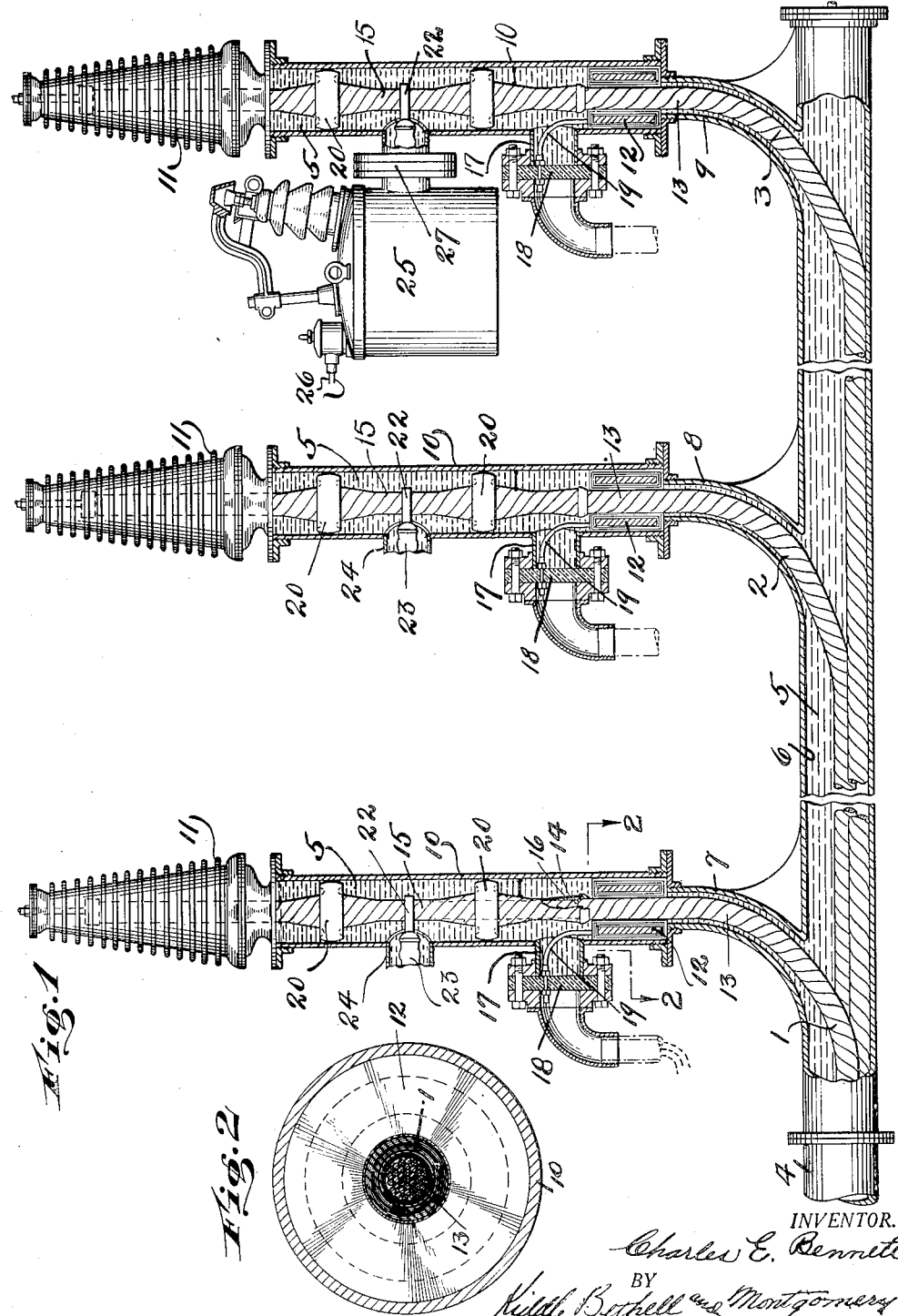

Dec. 1, 1936.   C. E. BENNETT   2,062,289
ELECTRIC CABLE SYSTEM
Filed June 8, 1934   2 Sheets-Sheet 2
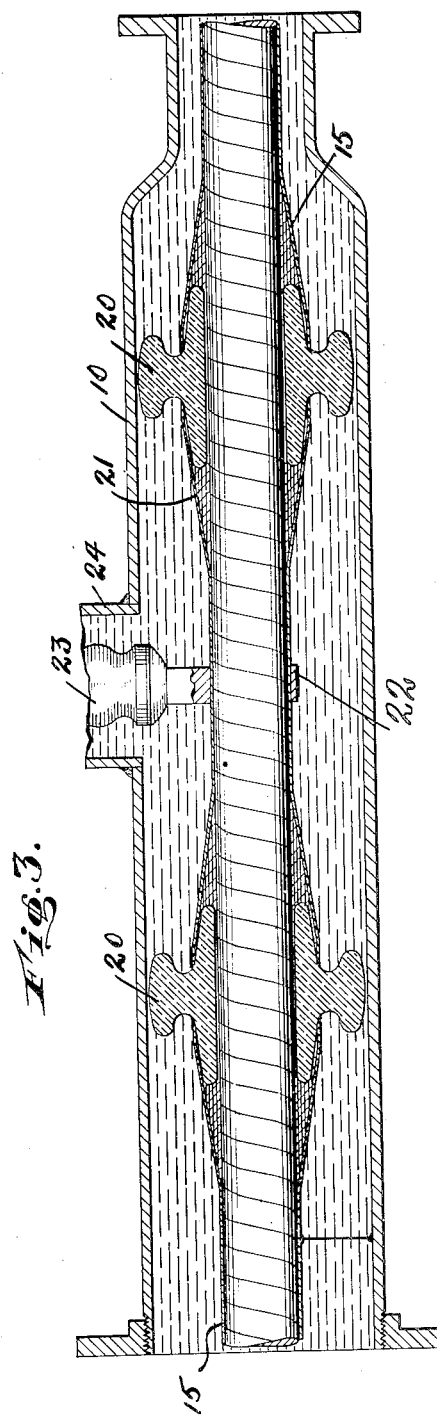
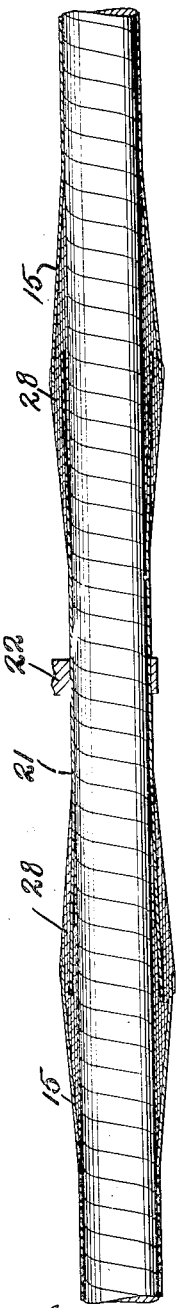
INVENTOR.
Charles E. Bennett,
BY
Riddle, Bothell and Montgomery.
ATTORNEYS.

Patented Dec. 1, 1936

2,062,289

UNITED STATES PATENT OFFICE 2,062,289

ELECTRIC CABLE SYSTEM

Charles E. Bennett, Ridgewood, N. J., assignor to The Okonite-Callender Cable Company, Incorporated, Paterson, N. J., a corporation of New Jersey Application June 8, 1934, Serial No. 729,607

3 Claims. (Cl. 247—3)

This invention relates to cable systems of the type in which the insulated unsheathed cable conductors are enclosed in a pipe filled with oil maintained under a high pressure, say, for example, 200 pounds to the square inch, but in any event under sufficiently high pressure to increase the dielectric strength of the oil, and has for one of its objects the provision in such a system, particularly at the terminals thereof current transformers and coupling condensers adapted to be connected to instruments such as relays or other burden and to synchronizing and potential indicators, etc.

A further object of my invention is the provision of a construction which is relatively inexpensive as compared with prior systems, and very compact so as to occupy only the minimum of space.

A still further object of my invention is the installation of current transformers and coupling condensers directly in the terminal structure of a cable system such as I have above briefly referred to.

Terminal structures such as disclosed in my copending application Serial No. 631,442, filed September 2, 1932, for example, are very well adapted for use in connection with the practice of my invention.

In the drawings accompanying this application:

Fig. 1 is a part sectional elevational view showing an embodiment of my invention;

Fig. 2 is a section on the line 2—2 of Fig. 1;

Fig. 3 is a sectional elevational view of the structure providing the condenser coupling shown on a smaller scale in Fig. 1; and Fig. 4 is a modification of the structure of Fig. 3.

Referring to the drawings in detail, the insulated unsheathed conductors 1, 2 and 3 of a three phase cable system are enclosed in a pipe line 4 of steel, iron, or other suitable material capable of containing the oil 5 under high pressure say, for example, 200 pounds to the square inch or even higher.

Secured to the pipe line 4 is a terminal manifold 6 constituting in effect a continuation of the pipe line. This manifold is equipped with outlet pipes 7, 8 and 9 which may conveniently be integral with the manifold 6. An outlet pipe is provided for each cable conductor as will be apparent from the drawings.

A riser designated 10 is sealed liquid-tight to the outer end of each of the outlet pipes 7, 8 and 9. To the outer end of each of the risers 10 is sealed an insulator 11, each of the cables 1, 2 and 3 extending through an outlet pipe, riser and into the insulator 11. This construction employed within each of the insulators 11 may be the same as that disclosed in my copending application above referred to. Inasmuch as the outlet pipes, risers and insulators are in communication with the pipe line it will be appreciated that each cable to its outer end is submerged in oil under high pressure.

Each of the cables 1, 2 and 3 is provided with shielding tape designated 13. Within each riser 10 and submerged in the oil therein is a current transformer 12 each insulated shielded cable passing through the transformer. In each instance the shielding tape 13 is discontinued a short distance above the top of each transformer as shown at 14, the tape about the remainder of the cable and which I have designated 15 being separated from the tape 13 by several layers of varnished cambric 16 or other suitable insulating material.

Adjacent each of the transformers 12 each of the risers 10 is provided with a lateral outlet 17. Each of these outlets is provided with a barrier 18 which is a bakelite disc, for example, the leads 19 from the transformers passing through these discs liquid-tight to the outer side of the discs where they will be connected to rubber covered or other type 110 volt wire running to measuring instruments or other burden which are operated by current from the transformer.

This provides a very simple and efficient construction particularly useful with cable systems of the type in which the insulated cable conductors are maintained submerged in oil under high pressure, the transformers 12 as will be appreciated being likewise submerged in this oil at all times so as to benefit by the high pressure at which the same is kept.

It is to be understood that the number of leads taken from the transformers 12 may be varied to suit various conditions and it will be appreciated, furthermore, that while I have mentioned the barrier discs 18 as being composed of bakelite, other materials may be employed, if desired, even metal in which latter event bushed connections would be employed at the barriers.

From all of the foregoing it will be seen that I have provided current transformers in connection with a power cable system wherein the transformers surround the cable conductors and are conveniently installed directly in the cable terminals, thereby providing transformers comparable in size and characteristics to ordinary laboratory type instruments.

Prior to my invention and especially in high voltage service it has been necessary to build special transformers and bushings to take care of the means for measuring currents, these transformers and bushings being of great size and very expensive as compared to the present invention. Furthermore, in prior structures the magnetic field is necessarily considerably removed from the cable conductor so that the transformers are not nearly as efficient as in the structure provided by the present invention.

As above mentioned one of the objects of the present invention is to provide coupling condensers in the cable terminals, thereby obtaining a very compact and inexpensive construction and eliminating the expense incident to prior structures where condensers of different capacities must be purchased for different installations, the present construction being such as to provide for any desired capacity in the device itself. More specifically, I propose to employ the conductor of the power cable as one plate of a condenser, the shielding tape of the power cable functioning as the other plate of the condenser. It will be evident by varying the effective length of this shielding tape any desired capacity can be obtained.

Referring more particularly to Fig. 3 it will be seen that the shielding tape 15 for each conductor is split into sections, insulated from each other by insulators 20 so as to provide a short length 21 of shielding tape within the terminal riser insulated from the cable conductor and from the remainder of the shielding tape as well as from the risers 10. This short length of shielding tape constitutes one plate of my condenser the other plate, as above mentioned, being provided by the conductor itself. Obviously by varying the length of the shielding section or condenser plate 21 the capacity of the condenser may be varied to any extent desired. This is of great economical and practical advantage as compared with prior structures where it is necessary to purchase and install a separate condenser where condensers of different capacities are desired.

About the sheath length or plate 21 I provide a connector 22 which passes through an insulator 23 in an outlet 24 from each of the risers 10 to the transformer, shown diagrammatically at 25, which is of standard construction in instrument work such as for synchronizing and potential indicators. The leads from the transformer 25 to any burden are shown at 26.

I might mention that while the transformer 25 is enclosed in oil it is not necessary that this oil shall be under the pressure at which the oil in the cable is maintained, the disc 27 shown in the connection between the transformer and the riser 10 being in the nature of a barrier disc.

In Fig. 4 I have shown a slight variation from the construction shown in Fig. 3. In this showing the shielding length 21 is insulated from the rest of the shielding by discontinuing the shielding, as in the case of Fig. 3, and employing insulating tape 28 as the insulating means, as distinguished from the insulators 20 of Fig. 3.

Prior to my invention it has been usual to employ special capacity couplings to connect the special transformer 25 with the high voltage line. Such special apparatus, however, is only capable of delivering very small quantities of power, in the neighborhood, for example, of 60 volt-amperes, while in my construction any amount of power within reason may be delivered, which may be in the neighborhood of ten times that just mentioned. With my construction the size of the cable bushing is not increased nor does my construction necessitate any additional room.

It is to be understood that changes may be made in the details of construction above described within the purview of this invention.

What I claim is:—

1. In a cable system, the combination of a pipe line, an insulated cable conductor disposed therein, oil under pressure in the pipe line in which the cable is immersed, grounded shielding tape about the insulation of the cable, an outlet and riser freely communicating with the pipe line, a terminal carried by the riser, the cable extending through the outlet and riser into said terminal, a transformer within the riser submerged in the high pressure oil therein, and immediately surrounding the said shielding tape, and a lead for said transformer extending liquid tight to the exterior of the riser.

2. In a cable system, the combination of a pipe line, an insulated cable conductor disposed therein, oil under pressure in the pipe line in which the cable is immersed, grounded shielding tape about the insulation of the conductor, an outlet and riser freely communicating with the pipe line, a terminal carried on the outer end of the riser, a transformer within the riser, immersed in the high pressure oil therein, said cable extending through the outlet, riser and transformer to said terminal, the transformer immediately surrounding said shielding tape.

3. In a cable system, the combination of a pipe line, insulated unsheathed cables loosely disposed in said pipe line, grounded shielding tape about the insulation of the cable, a manifold secured to and constituting a continuation of said pipe line, outlets for said manifold, risers secured liquid tight to each outlet, a terminal insulator secured liquid tight to each riser, the insulated unsheathed cable conductors extending through the outlets and risers to the outer ends of said terminal insulators, said outlets and risers being in free communication with each other and through the manifold with the pipe line, oil under high pressure in said pipe line, manifold, outlets and risers, in which the insulated cable conductors are immersed, and a transformer within each riser submerged in the high pressure oil therein and immediately surrounding the shielding tape of the cable.

CHARLES E. BENNETT.